United States Patent [19]

Buchs et al.

[11] Patent Number: 5,347,092

[45] Date of Patent: Sep. 13, 1994

[54] COMPENSATION SCALE FOR MEASURING THE WEIGHT OR MASS OF AN OBJECT

[75] Inventors: Willy Buchs, Lonay; Roland Cochard; Pierre Jeannin, both of Morges, all of Switzerland

[73] Assignee: Robert Bosch GmbH, Stuttgart, Fed. Rep. of Germany

[21] Appl. No.: 910,291

[22] PCT Filed: Dec. 4, 1990

[86] PCT No.: PCT/DE90/00935

§ 371 Date: Jul. 20, 1992

§ 102(e) Date: Jul. 20, 1992

[87] PCT Pub. No.: WO91/10884

PCT Pub. Date: Jul. 25, 1991

[30] Foreign Application Priority Data

Jan. 20, 1990 [DE] Fed. Rep. of Germany ....... 4001614

[51] Int. Cl.$^5$ ............................................. G01G 1/38
[52] U.S. Cl. ............................................. 177/212
[58] Field of Search ............................................. 177/212

[56] References Cited

U.S. PATENT DOCUMENTS

| | | |
|---|---|---|
| 3,800,893 | 4/1974 | Ramsay et al. ................ 177/25.19 |
| 3,816,156 | 6/1974 | Baumann et al. ................ 177/15 |
| 3,986,571 | 10/1976 | Strobel et al. ................ 177/185 |
| 4,494,620 | 1/1985 | Knothe et al. ................ 177/25 |
| 4,553,618 | 11/1985 | Kusmenskji et al. ................ 177/185 |
| 4,593,778 | 6/1986 | Konishi et al. ................ 177/185 |
| 4,624,331 | 11/1986 | Naito ................ 177/185 |
| 4,653,600 | 3/1987 | Melcher et al. ................ 177/229 |
| 4,678,050 | 7/1987 | Wirth et al. ................ 177/229 |
| 4,751,973 | 6/1988 | Freeman et al. ................ 177/25.19 |
| 4,875,534 | 10/1989 | Kunz ................ 177/212 |
| 4,926,359 | 5/1990 | Konishi et al. ................ 177/25.19 |
| 5,117,929 | 6/1992 | Nakamura et al. ................ 177/185 |

OTHER PUBLICATIONS

Milz, Udo "Acceleration Compensated Measurement of Force, Mass and Speed" Dissertation for Rheine-Westphalia Technical University, Achen, Germany (1980) pp. 1–17 and 43–51.

Primary Examiner—Benjamin R. Fuller
Assistant Examiner—Randy W. Gibson
Attorney, Agent, or Firm—Spencer, Frank & Schneider

[57] ABSTRACT

Proposed is a compensation scale (10) in which at least one acceleration sensor (24, 25) is disposed at a movable component (14) of the scale (10) and puts out a signal to a correction signal processing arrangement (50) which determines at least one correction signal (53, 54, 56) for influencing the measuring result that appears at the output (43) as a measure for the weight or the mass (m) of the load (15) with which the movable component (14) was charged. The correction signals (53, 54, 56) eliminate the influence of translatory and rotatory interference accelerations (ÿ, Θ̈) which act on the base plate (11) of the scale and, without being corrected, would falsify the measuring result (43) or at least unduly extend the measuring time.

19 Claims, 2 Drawing Sheets

COMPENSATION SCALE FOR MEASURING THE WEIGHT OR MASS OF AN OBJECT

BACKGROUND OF THE INVENTION

1. Field of the Invention

State of the Art

The invention relates to a compensation scale as disclosed, for example, in German Patent 3,230,998.

2. Description of Related Art Compensation scales include a movably guided component that is deflected from a rest position by a load to be determined as well as an electromagnetic arrangement which generates a force with which the deflectable component is held, for example, in the rest position independent of the load. The current flowing through a coil of the electromagnetic arrangement is a measure for the load, for example, the weight of the load. Scales generally have the characteristic that they may react with false measured values when the location where they are set up experiences shocks. The reasons for this are forces that act on the mechanical elements of the scale and on the load due to mass acceleration.

German Patent 3,230,998 discloses a compensation scale whose output signal is influenced by a correction signal that is derived from an acceleration sensor which is fixed to the placement location in the vicinity of the scale and determines the interference accelerations of the placement location.

It is the object of the invention to provide a compensation scale whose measurement signal is substantially free of interference signals over a wide frequency range.

SUMMARY AND ADVANTAGES OF THE INVENTION

The compensation scale according to the invention as defined by the features of the main claim has the advantage that the weight or the mass of a load can be determined with great accuracy after a short time. The improvement in the interference signal suppression is realized in that at least one acceleration sensor is disposed at the movably guided component that is charged by the load. This acceleration sensor puts out a signal for a correction signal processing arrangement which determines at least one correction signal for influencing the measuring result. The arrangement of the acceleration sensor at the movable component permits the detection of the actual interference signals which falsify the measuring result in that there is an additional determination of a relative acceleration that occurs between the movable component and the fixed component of the scale, something that is not possible with the known devices.

Advantageous modifications and improvements will become evident from the dependent claims.

In a particularly advantageous modification, at least two acceleration sensors are disposed at the movable component of the scale for detecting a translatory acceleration in the weighing direction and a rotational acceleration of the movable component. Rotational accelerations are particularly annoying in scales equipped with a lever with which the force to be generated by the electromagnetic arrangement can be influenced, preferably reduced, with respect to the force generated by the load. The at least two sensors are arranged relative to the pivot axis of the lever in such a way that a difference formation between the signals emitted by the sensors provides the rotational acceleration. Alternatively, one sensor is arranged in such a way that it detects only rotational acceleration.

According to a feature of the compensation scale according to the invention, it is provided that, after a determination of the current flowing through the coil of the electromagnetic arrangement, which is a measure for the weight or the mass of the load, the at least one correction signal influences the result.

An increase in the operating speed of the compensation scale is possible in that at least one correction signal influences that part of the signal processing arrangement which determines the current through the coil. Delays caused by the travel time of the signals are substantially avoided in this way.

The correction signal processing arrangement is advantageously divided into two signal paths of which one is provided for the correction of the translatory acceleration and the other for the correction of the rotational acceleration. The rotational acceleration is obtained, for example, by a difference formation between the signals output by the two acceleration sensors. Subtracting the rotational acceleration from the signal of at least one of the two acceleration sensors then makes it possible to provide a separate representation of the translatory acceleration.

The division into two correction signal paths permits an improved correction in that the two different types of acceleration are each processed in a function block which performs a transfer function that includes at least one constant as well as one further constant which is multiplied by the output signal representing the weight or the mass of the load. The constants are determined from the mass distribution and the geometrical facts of the scale.

Another increase in interference suppression is possible by a filter stage disposed in each correction signal path for simulating a second order transfer function that is matched to the scale. In a simpler embodiment, a filter is provided which is arranged downstream of the combination of the correction signals.

If at least one correction signal influences the result after the determination of the current, a possibly occurring signal delay must be provided for either the measuring signal or the correction signal so that coherence exists during the combination of the signals.

A further increase in the operating speed of the scale is possible by influencing a differential component of a proportional-differential controller included in the signal processing arrangement, such influencing being effected as a function of the output signal of the scale representing the weight or the mass of the load, in which case the square root of the signal is initially determined.

The realization of the compensation scale according to the invention is particularly advantageous in a so-called single-block configuration. In this case, several component groups of the scale are worked out of a single workpiece. Preferably, the electromagnetic arrangement, the movably guided component that is charged by the load and the correction acceleration sensors as well as possibly a lever are made of one piece, with flexible bearings and possibly provided pivot bearings also being worked out of the same piece. With this measure, uniformity of the two correction acceleration sensors is realized. Moreover, the homogeneous material permits the realization of a predetermined temperature distribution. The-single-block configuration thus increases the measuring accuracy and its reproducibility.

Further details and improvements of the compensation scale according to the invention will become evident from the description below.

DETAILED DESCRIPTION OF THE PREFERRED EMBODIMENT

Figure 1:
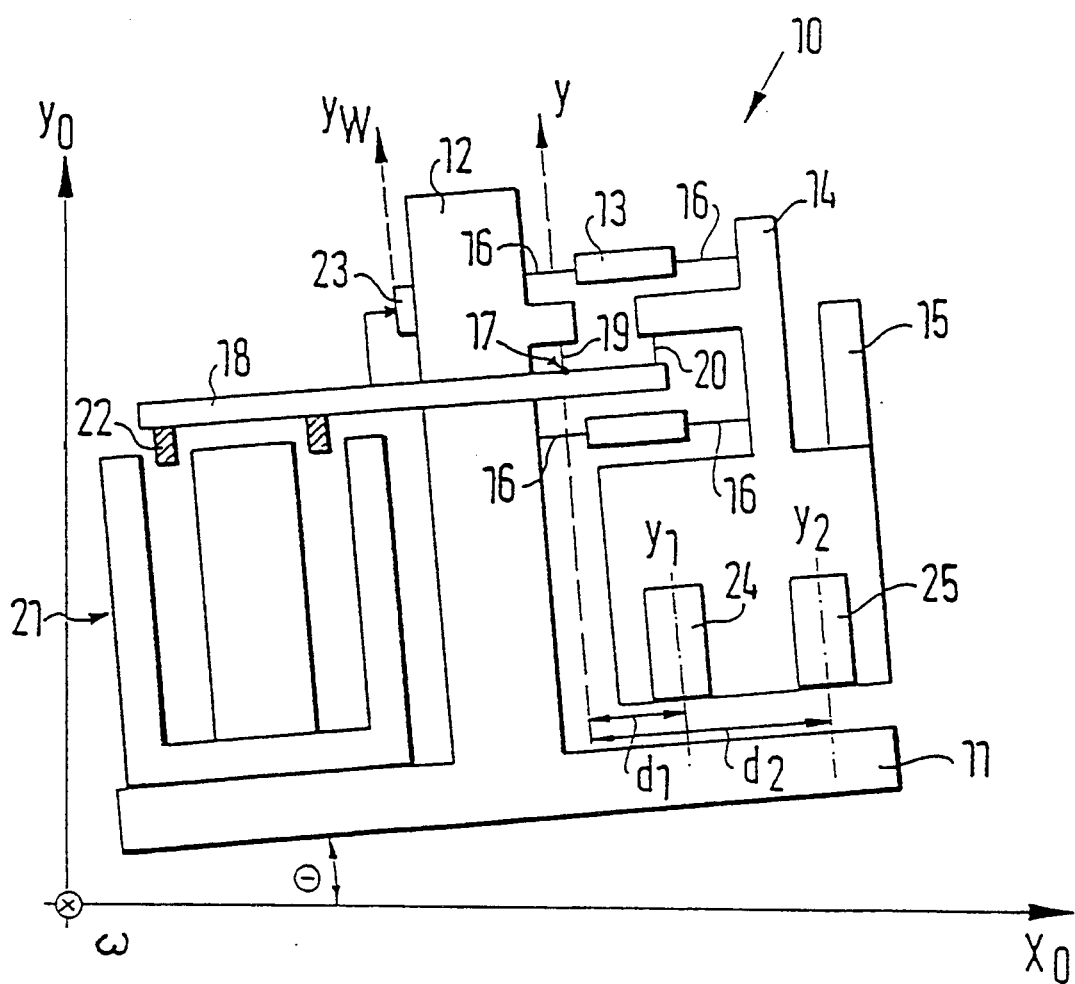
Fig. 1 shows the configuration of a compensation scale and FIG. 2 is a block circuit diagram for an evaluation unit for determining the weight or the mass of a load.

The compensation scale 10 shown in FIG. 1 is mounted on a base plate 11 which is fixed to the location where scale 10 is set up. Base plate 11 includes a fixed carrier 12 at which, by way of an elastic guide parallelogram 13, a movable component 14 is fastened. A load 15 whose weight or mass is to be determined can be placed onto movable component 14. The elastic guide parallelogram 13 includes flexible bearings 16 with which the connections are made.

A lever 18 is fastened to carrier 12 by way of a flexible joint 19 and is provided at its one end with a flexible bearing 20 with which movable component 14 is connected. The other end of lever 18 cooperates with an electromagnetic arrangement 21 that includes a coil 22 shown in FIG. 1 as connected with lever 18. The pivoting movement of lever 18 when the movable component is charged with a load 15 or scale 10 is charged with interfering shocks can be detected by a position sensor 23, at least if the deflections are small, as an approximately linear displacement in the $y_w$ direction.

Movable component 14 includes a first acceleration sensor 24 and a second acceleration sensor 25 which each detect an acceleration in the $Y_1$ direction and in the $Y_2$ direction, respectively. The two sensors 24 and 25 are spaced at different distances $d_1$ and $d_2$ relative to a y direction that coincides with the weighing direction and goes through the pivot point 17 of lever 18.

Compensation scale 10 is exposed to translatory as well as rotational interferences in coordinate system $\omega$, $x_0$, $Y_0$. Since lever 18 is able to perform a rotational movement $\Theta$ relative to carrier 12 about an axis that is perpendicular to the plane of the drawing and passes through pivot point 17, a rotation $\Theta$ coming from the outside and acting on coordinate system $\omega$, $x_0$, $Y_0$ produces an interference. The translatory interference occurs in coordinate system $\omega$, $x_0$, $Y_0$ in the $x_0$ and $Y_0$ directions with its component becoming effective in the y direction. Because of the elastic guide parallelogram 13, movable component 14 is able to perform a relative movement in the y direction with reference to carrier 12, with the acceleration of this movement being called $y_R$.

The compensation scale 10 is advantageously realized in the so-called single-block configuration. In this case, various component groups are worked out of one workpiece. Preferably, at least movable component 14, elastic guide parallelogram 13 including flexible bearings 16, lever 18, flexible joint 19, the portion of the electromagnetic arrangement 21 disposed at lever 18 and acceleration sensors 24 and 25 are worked out of one workpiece.

Figure 2:
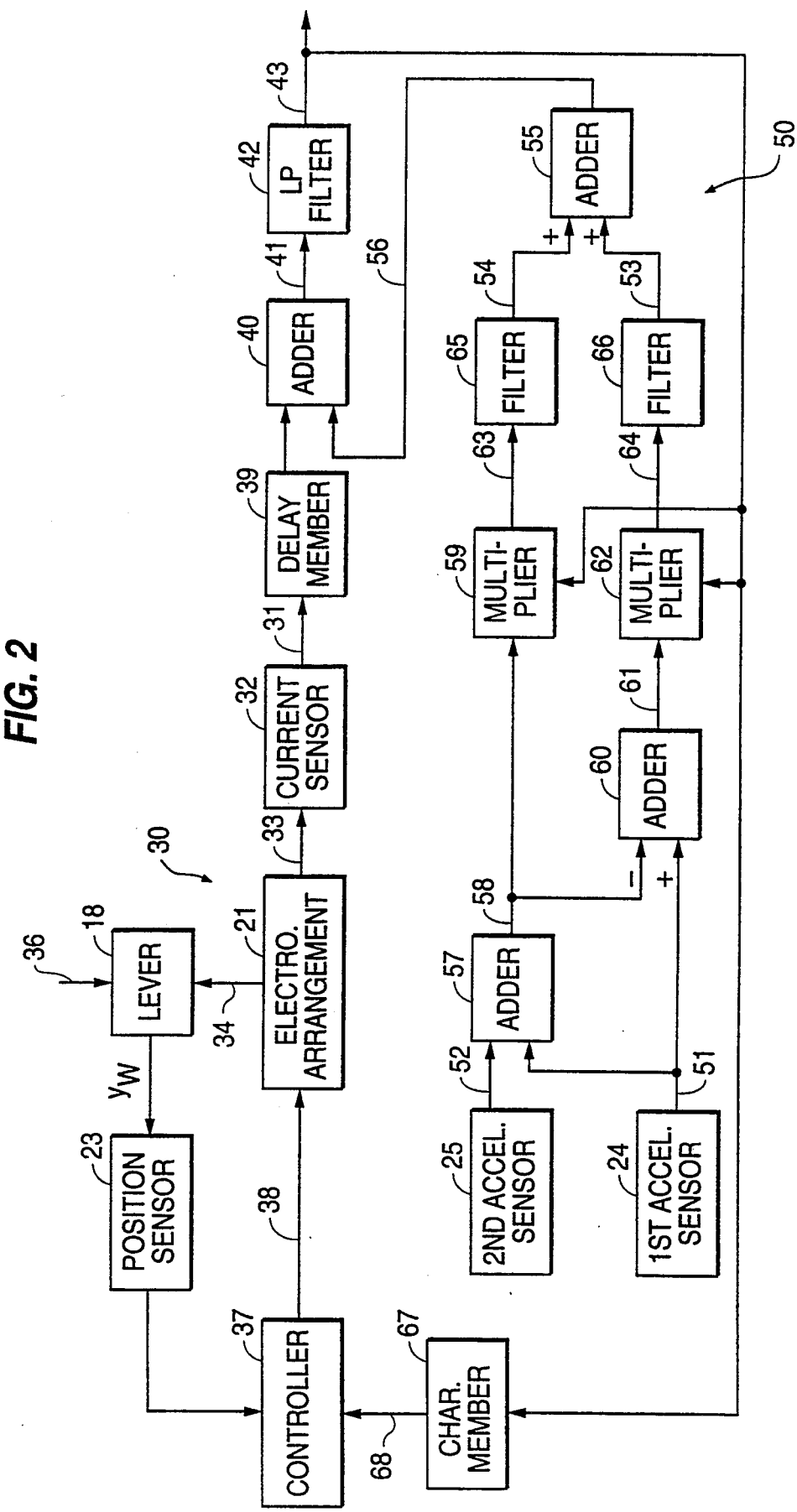

FIG. 2 shows the block circuit diagram for an evaluation unit of scale 10. The parts in FIG. 2 which coincide with those shown in FIG. 1 bear the same reference numerals in FIG. 2 as in FIG. 1. The block circuit diagram includes a signal processing arrangement 30 which determines at least one uncorrected scale output signal 31 that appears at a current sensor 32 which detects the current flowing through the coil 22 of electromagnetic arrangement 21. The force 34 generated by electromagnetic arrangement 21 acts on lever 18 which is also exposed to interferences 36. Lever 18 reacts with a deflection in the $Y_w$ direction which is detected by position sensor 23 and fed to a controll 37. A desired value generator for controller 37 is not shown in FIG. 2 since the desired value is generally fixed and preferably coincides with the rest position of lever 18 and thus with that of movable component 14. The output signal 38 of controller 37 is a current which is converted into a force 34 by electromagnetic arrangement 21.

The uncorrected output signal 31 of scale 10 is fed by way of a delay member 39 to an adder 40 whose output signal 41, after being lowpass filtered in 42, is output as the scale output signal 43 as a measure for the weight or the mass of load 15.

The block circuit diagram of FIG. 2 further includes a correction signal processing arrangement 50 which determines correction signals 53 and 54 from the output signals 51 and 52 of the two acceleration sensors 24 and 25. These correction signals are combined in an adder 55 and are fed as a total correction signal 56 to adder 40. The correction signal processing arrangement 50 includes an adder 57 which determines the difference between the two signals 51 and 52 output by acceleration sensors 24 and 25, respectively. The output signal 58 of adder 57 travels, on the one hand, to a function block 59, a multiplier, and, on the other hand, as the first input signal to an adder 60 which receives as its second input signal the output signal 51 of sensor 24. Adder 60 subtracts the signal 58 determined by adder 57 from the signal 51 of sensor 24 and outputs an output signal 61 to a function block 62, a multiplier. Each one of the two function blocks 59 and 62 conducts its output signal 63 and 64, respectively, to a filter 65 and 66, respectively, with correction signals 53 and 54, respectively, appearing at the filter outputs.

Function blocks 59 and 62 also receive the corrected output signal 43. Additionally, the corrected output signal 43 is fed to a characteristic member 67 which conducts an output signal 68 to controller 37.

The operation of compensation scale 10 and the correction of the measuring result under consideration of the interferences 36 acting on scale 10 will be described in greater detail with reference to FIGS. 1 and 2.

Compensation scale 10 determines the weight or the mass of load 15 by way of the force m g acting on scale 10, where m is the mass of load 15 and g the acceleration of gravity of the earth. The charging of the movable component 14 of scale 10 results in a deflection of lever 18 in the $Y_w$ direction which is detected by position sensor 23. Controller 37 makes available a current in the form of an output signal 38 for electromagnetic arrangement 21 which flows through coil 22 as a function of the actual value supplied by position sensor 23 and as a function of a desired value which preferably corresponds to the rest position. In this way, electromagnetic arrangement 21 generates a force that counteracts the force generated by load 15 and which results in preferably the rest position of lever 18 and of movable component 14, respectively, being re-established. The re-establishment of the rest position after a load 15 is placed on the scale corresponds to a complete compensation of the weight force by the electromagnetic force.

The interference force 36 acting on scale 10 can be represented as follows:

$$P = -(Am+B)\ddot{y} - (Cm+D)\ddot{\Theta} + (k \cdot m \cdot g)$$

Consideration of the term K·m·g means that the effect of the load 15 on movable component 14 is initially treated as an interfering force.

The constant K is a function of the structural configuration of the scale and of the current required for compensation.

Constants A, B, C and D result from the mass distribution and geometrical facts of scale 10.

The interfering forces acting on movable component 14 and the load 15 result in a deflection of lever 18 in the $Y_w$ direction which leads to an uncorrected output signal 31 that can be represented as follows:

$$V(s) = G(s) \cdot [-(Am+B)\ddot{y} - (Cm+D)\ddot{\Theta} + (k \cdot m \cdot g)]$$

where s is the variable of the Laplace transform, G(s) provides the transfer function of scale 10 which at least approximately corresponds to a second order system.

The signal V(s) is composed of the measuring signal G(s)·K·m·g which is interfered with by the signal P·G(s).

In order to cancel the interference signal component G(s)·P, the correction signal processing arrangement 50 generates a total correction signal 56 as a function of the signals 51 and 52 provided by the acceleration sensors 24 and 25 disposed on movable component 14. A cancellation of interference signal P in adder 40 is possible if correction signal 56 corresponds precisely to interference signal P. The two signals must therefore be coherent. Their ratio should equal 1 for every frequency in the frequency range of interest, for example from 0 to 100 Hz. A high upper frequency limit signifies a correspondingly short measuring time within which a measuring result is available with a certain accuracy, for example 1%.

For making available the total correction signal 56, the difference between signals 51 and 52 output by acceleration sensors 24 and 25 is initially formed in adder 57. The signal 51 of acceleration sensor 24 can be represented as $$V_1 = K_1 \cdot (\ddot{y} + d_1 \cdot \ddot{\Theta} + \ddot{y}_R),$$

the signal from acceleration sensor 25 as $$V_2 = K_2 \cdot (\ddot{y} + d_2 \cdot \ddot{\Theta} + \ddot{y}_R).$$

Acceleration sensors 24 and 25 are matched in such a way that the same accelerations result in the same output signals 51 and 52. Difference formation in adder 57 provides the rotational acceleration $\ddot{\Theta}$ as output signal 58. Difference formation in adder 57 causes the translatory accelerations $\ddot{Y}_R$ and y to drop out. The difference between distances $d_1$ and $d_2$ is also known and can be considered a constant weighting factor. Function block 59 multiplies the input value with a term Cm+D. The mass m of load 15 is derived from the output signal 43 at the output of lowpass filter 42. For this purpose, output signal 43 may need to be weighted with a weighting factor. This weighting is not shown in FIG. 2 nor are other weightings. If necessary, the output signal 63 of function block 59 is fed to a filter 65 whose transfer function $F_2(s)$ is selected to be at least approximately equal to the transfer function G(s) of scale 10. Preferably, the transfer function $F_2(s)$ is selected in such a way that it represents the ratio of the electrical current in coil 22 to the interference acceleration $\Theta$. Filter 65 is then called an imaging filter. Output signal 54 is thus the component of the total correction signal 56 provided for the correction of rotational acceleration $\Theta$.

In an adder 60, the rotational acceleration component $\Theta$ is subtracted from the output signal 51 of acceleration sensor 24. The rotational acceleration $\Theta$ is weighted before the subtraction so that the rotational acceleration $\Theta$ no longer appears at the output 61 of adder 60. Output signal 61 can be represented as $$u(s) + k(y + y\varepsilon).$$

This signal can be reshaped into an expression which contains only y as a variable. This signal is fed to a function block 62 which multiplies the signal with the term Am+B. If necessary, a filter 66 is provided whose transfer function $F_1(s)$ is also at least approximately equal to that of the scale. The transfer function $F_1(s)$ of filter 66 is also preferably realized in such a manner that it represents the ratio of the electrical current flowing through coil 22 of electromagnetic arrangement 21 to the interference acceleration y. Filter 66 is then called an imaging filter.

The total correction signal 56 thus results as follows:

$$G(s) [(Am+B)y + (Cm+D)\Theta]$$

and thus precisely corresponds to interference signal component P. The addition in adder 40 with the correct phase eliminates the interference signal component.

A reduced frequency range within which the interference signals are eliminated results from the omission of one or both filters 65 and 66. Another possibility is given in that adder 55 is followed by a single filter whose transfer function is at least approximately that of an imaging filter which represents the ratio of the coil current to the interference accelerations. The reduction of the frequency range is equivalent to an extension of the measuring time. In contrast thereto, the measuring time can be shortened if output signal 43 is fed to controller 37 after conversion. A characteristic member 67 determines the mass m of load 15 from output signal 43, unless the latter has already been standardized, and calculates its square root. The result is considered in the determination of a differential component of controller 37 which is configured as a proportional-differential controller.

Another correction possibility is for the correction signals 53 and 54 or the total correction signal 56 to be fed in within the closed control circuit. This action is possible in the part of signal processing arrangement 30 that determines the coil current in electromagnetic arrangement 21. For example, a correction signal is added to the output signal 38 of controller 37. It is possible, for example, to have the correction of the rotational acceleration $\Theta$ made by correction signal 54 actions in signal processing arrangement 30 while the correction of the translatory acceleration y continues to be made in adder 40. A change in location of at least one correction action into the control circuit leads to an increase in the operating speed of the scale. This measure slightly reduces the stability of the control circuit and requires correspondingly higher matching expenses.

The delay in signal travel caused in correction signal processing arrangement 50 with respect to the uncorrected output signal 31 can be eliminated very easily by a delay member 39 which is connected ahead of adder 40.

The lowpass filter 42 connected ahead of output 43 eliminates high frequency interference oscillations which lie far above the frequency range of interest.

The described arrangement is suitable for the correction of interference signals in a compensation scale equipped with a lever. In this type of scale, rotational accelerations Θ are particularly annoying. Substantial elimination of interference is also realized with the arrangement of FIG. 2 in a simpler compensation scale that is not equipped with a lever. In these scales, in which the movable component 14 is connected directly with electromagnetic arrangement 21, the signal path 25, 57, 59, 65 in correction signal processing arrangement 50, which is responsible for the determination of rotational acceleration Θ, can be omitted. Adder 60 is also no longer required.

The entire evaluation circuit can be implemented as a program in a computer system. The measured values picked up by sensors 23, 24 and 25 are provided as input signals. Data regarding the current 38 required for a compensation of the interference and the measuring result 43 are available as output signals.

Moreover, the earth's acceleration g existing at the measuring location and/or the temperature may be provided as the input signals of a discrete evaluation circuit or a computer system. The influence on the measuring result emanating from these values can then also be corrected.

We claim:

1. A compensation scale comprising,
   a movably guided component that is deflected from a predetermined position relative to a carrier of the scale in at least one direction by a load whose weight or mass is to be determined;
   an electromagnetic arrangement which includes at least one coil for generating a force relative to the load;
   a lever coupled to the movably guided component and mounted to move about a pivot point for influencing the force generated by the electromagnetic arrangement relative to the load;
   a position sensor which determines the position of the movable component relative to the carrier and outputs a signal;
   a controller which determines current flowing through the coil as a function of the signal output by the position sensor so that the movable component returns to the predetermined position with the current being a measure for the weight or the mass of the load, the controller producing an uncorrected measuring result signal related to the current;
   at least two acceleration sensors disposed at the movable component for determining the translatory acceleration in the at least one direction and a rotational acceleration of the movable component about a rotation axis passing through the pivot point and essentially perpendicular to the lever, the acceleration sensors outputting signals to a correction signal processing arrangement which determines at least one correction signal for correcting the uncorrected measuring result signal representing the measure for the weight or mass of the load to produce a corrected measuring result signal.

2. A scale according to claim 1, wherein the at least one correction signal acts on the uncorrected measuring result signal after the current has been determined.

3. A scale according to claim 1, wherein the at least one correction signal acts on the controller.

4. A scale according to claim 1, wherein the correction signal processing arrangement (50) includes first and second signal paths the first signal path producing a first correction signal for the translatory acceleration and the second signal path producing a second correction signal for the rotational acceleration.

5. A scale according to claim 4, including first and second functional circuits in the first and second correction signal paths, respectively, the first functional circuit continuously weighing the rotational acceleration with term $Cm+D$ and the second functional circuit continuously weighing the translatory acceleration with a term $Am+B$, where m is the mass of the load derived from the measuring result output signal by weighting and A, B, C and D are constants.

6. A scale according to claim 4, including a filter in at least one of the first and second signal paths having a transfer function corresponding to a second order system.

7. A scale according to claim 6, wherein the filter is configured as an imaging filter having a transfer function representing a ratio of the electrical current flowing through the coil of the electromagnetic arrangement to the acceleration of the respective signal path.

8. A scale according to claim 4, including a filter which receives the first and second correction signals as input signals, having a transfer function corresponding to a second order system and representing the ratio of the electrical current flowing through the coil of the electromagnetic arrangement to the respective accelerations.

9. A scale according to claim 1, including a current sensor for sensing the current flowing through the coil and producing the uncorrected measuring result signal and a delay circuit coupled to the current sensor for producing a delay of the uncorrected measuring result signal with the at least one correction signal to produce the corrected measuring result signal.

10. A scale according to claim 1, wherein the controller includes a proportional-differential controller circuit with the differential component being a variable as a function of $\sqrt{m}$.

11. A scale according to claim 9, including a filter coupled to the corrected measuring result signal to produce a corrected result output signal.

12. A scale according to claim 1, wherein at least the movable component the sensors the electromagnetic arrangement and the lever are constructed at least partially in single-block configuration and form a single workpiece.

13. A compensated scale for measuring weight or mass of an object, comprising:
   a position sensor for determining a position of a load in a first direction with respect to a first position and generating a position signal;
   a control device coupled to the position sensor and responsive to the position signal for generating a first current signal;
   an electromagnetic device coupled to the control device and responsive to the first current signal for generating a force for positioning the load in a direction opposite the first direction for reestablishing the load to the first position;

a first signal generator, responsive to the first current signal, for generating an uncorrected measurement signal related to the first current;

a first acceleration sensor for sensing a first acceleration of the load and generating a first correction signal;

a second acceleration sensor for sensing a second acceleration of the load and generating a second correction signal;

a correction signal processing device coupled to the first and second acceleration sensors, the correction signal processing device including a translatory acceleration device for determining the translatory acceleration of the load and generating a translatory acceleration correction signal based on the first and second correction signals, and a rotational acceleration device for determining the rotational acceleration of the load and generating a rotational acceleration correction signal based on the first and second correction signals; and a signal combiner coupled to the uncorrected measurement signal, the translatory acceleration correction signal and the rotational acceleration correction signal for generating a corrected measurement signal representing the weight or mass of the load.

14. The compensated scale according to claim 13, wherein the rotational acceleration device includes an adder for generating the rotational acceleration correction signal based on a difference between the first correction signal and the second correction signal.

15. The compensated scale according to claim 13, wherein the translatory acceleration device includes an adder for generating the translatory acceleration correction signal based on a difference between the first correction signal and a signal related to the rotational acceleration correction signal.

16. The compensated scale according to claim 13 further comprising a filter coupled to the corrected measurement signal for removing high frequency signal components from the corrected measurement signal.

17. A method for producing a compensated measurement signal for a weight or mass of a load comprising the steps of:

determining a position of a load in a first direction with respect to a first position and generating a position signal;

generating a first current signal related to the position signal;

generating a force related to the first current signal for positioning the load in a direction opposite the first direction for reestablishing the load to the first position;

producing an uncorrected measurement signal related to the first current signal;

sensing a first acceleration of the load and generating a first correction signal related to the first acceleration;

sensing a second acceleration of the load and generating a second correction signal related to the second acceleration;

generating a rotational acceleration correction signal related to the first and second correction signals;

generating a translatory acceleration correction signal related to the first and second correction signals; and combining the uncorrected measurement signal, the translatory acceleration correction signal and the rotational acceleration correction signal to produce a corrected measurement signal representing the weight or mass of the load.

18. The method according to claim 17, wherein the step of generating a rotational acceleration correction signal is based on a difference between the first correction signal and the second correction signal.

19. The method according to claim 17, wherein the step of generating the translatory acceleration correction signal is based on a difference between the first correction signal and a signal related to the rotational acceleration correction signal.

* * * * *